Oct. 5, 1926.

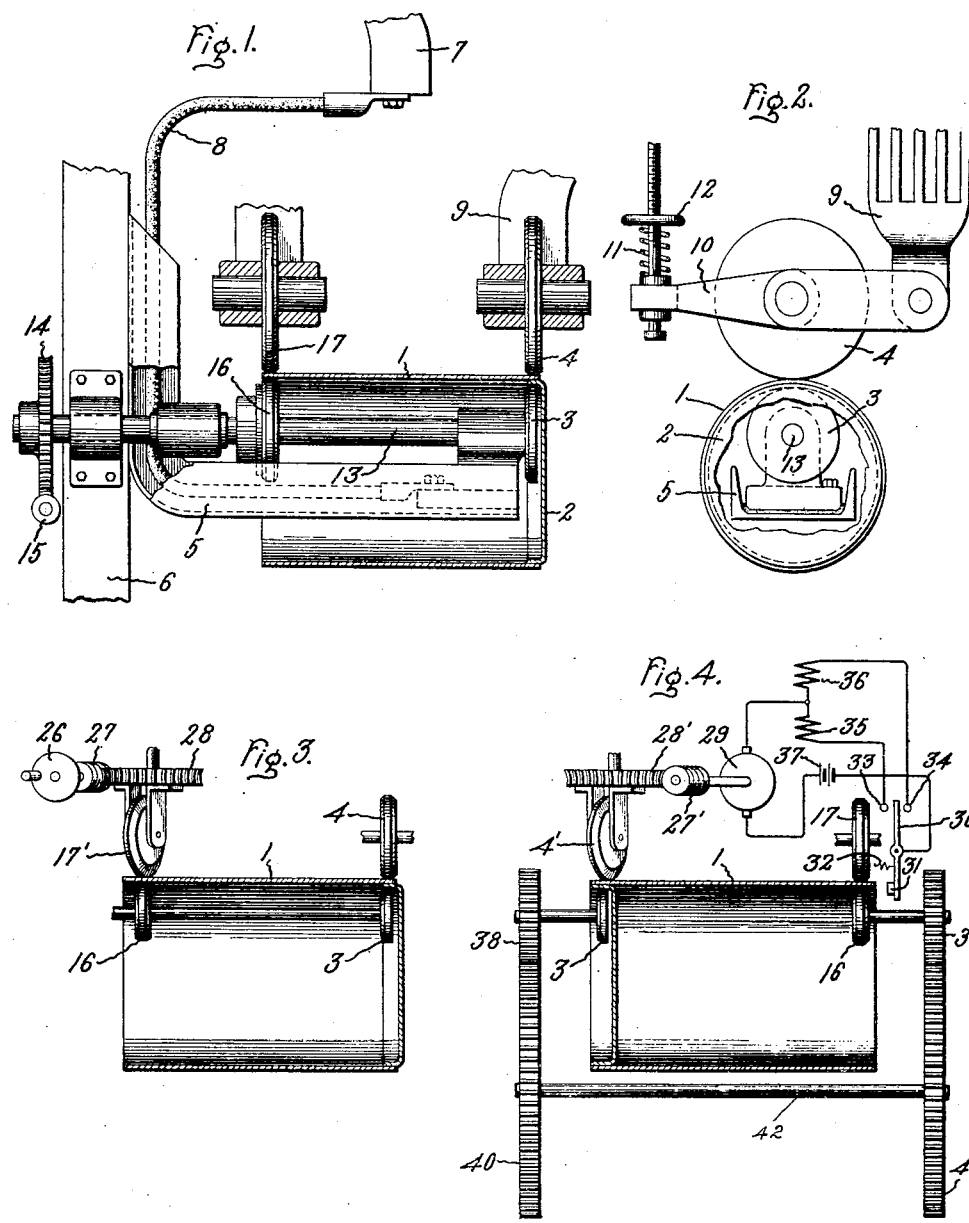

H. W. TOBEY 1,601,927

LINE WELDING

Filed August 27, 1923    2 Sheets-Sheet 2

Inventor:
Harry W. Tobey;
by
His Attorney.

Patented Oct. 5, 1926.  BEST AVAILABLE COPY  1,601,927

UNITED STATES PATENT OFFICE.

HARRY W. TOBEY, OF PITTSFIELD, MASSACHUSETTS, ASSIGNOR TO GENERAL ELECTRIC COMPANY, A CORPORATION OF NEW YORK.

LINE WELDING.

Application filed August 27, 1923. Serial No. 659,462.

My invention relates to electric welding of the type wherein a line weld is made by passing the work between a pair of rotatable disk electrodes which conduct current into the work to bring the parts to be welded to a welding temperature, the electrodes being pressed together to force the parts to be welded into intimate contact at the point of welding. This type of welding is well known in the art and a continuous line weld may be effectively made without the use of any other means to press upon or swage the joint. My invention more particularly relates to the production of circumferential welds of the type encountered for example in welding the head on a drum or tank, or the welding together of sections of such articles but certain features are of broader application.

An object of my invention is to provide an arrangement of apparatus which will enable circumferential welds of the class described to be made without burning the work and without producing a deleterious effect upon the weld by reason of the tendency of an electrode to pick up metal from the work. Another object of my invention is to provide an arrangement of parts which will lessen the tendency of the work to creep laterally with respect to the electrodes and arrangements of apparatus whereby such creeping may be counteracted.

My invention will be better understood from the following description taken in connection with the accompanying drawings, and its scope will be pointed out in the appended claims.

Figure 5:
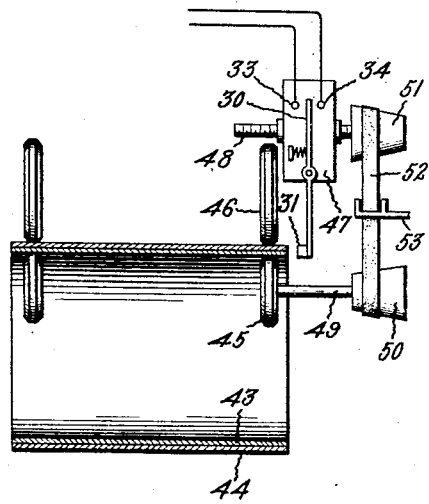
Figure 6:
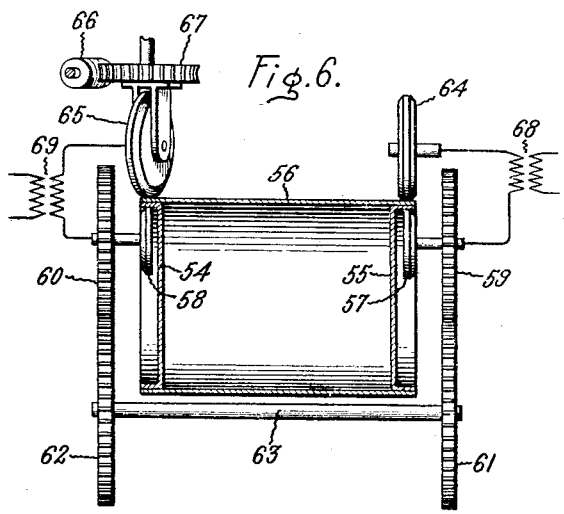
Figure 7:
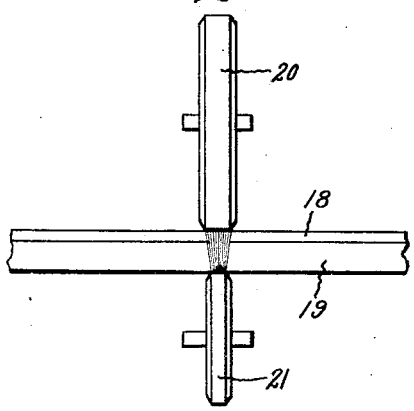
Figure 8:
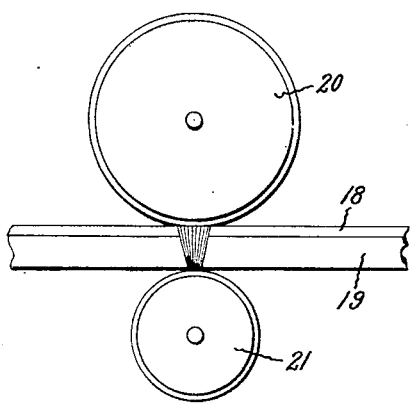
Figure 9:
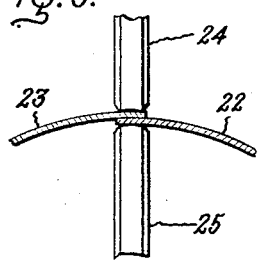

In the drawings, Fig. 1 represents an embodiment of my invention illustrating the welding of a head on the drum; Fig. 2 is an end view of Fig. 1 with certain parts omitted for clearness; Fig. 3 shows an arrangement embodying means whereby the tendency of the work to creep may be corrected; Fig. 4 shows automatic means for correcting any tendency of the work to creep; Fig. 5 illustrates a modification of the arrangement of Fig. 4 adapted to produce a spiral weld; Fig. 6 shows a modification adapted to weld both heads of a drum simultaneously; Figs. 7 and 8 are end and side views of a pair of welding electrodes engaging the work and illustrating how the dimensions of the electrodes affect the current distribution, and Fig. 9 shows a modified arrangement of electrodes for equalizing heating during the production of a longitudinal lap weld in curved work.

Referring to Figs. 1 and 2, the work 1 is illustrated as a drum to which the head 2 is being welded. A rotatable disk electrode 3 inside the drum makes a local arc of contact with a flange on the head 2. A rotatable disk electrode 4 contacts with the outside of the drum in line with the electrode 3. The electrode 3 is supported in any suitable manner inside the drum, the arrangement shown embodying a channel member 5 secured to the supporting frame 6. The current is supplied to the welding electrodes 3 and 4 from any suitable source in a manner well known in the art. As indicated in the drawing, one terminal 7 of the secondary winding of a transformer is connected by the lead 8 to the electrode 3 and the other terminal 9 of the winding is connected to the electrode 4.

Any suitable means may be provided for exerting pressure upon the work between the electrodes. As illustrated the electrode 4 is mounted on a pivoted arm 10. The spring 11 and hand wheel 12 enable any desired degree of pressure to be obtained.

The electrode 3 is rotated by suitable power operated means. In the drawing, the electrode is shown as driven by the shaft 13 upon which is the worm wheel 14 driven by a worm 15. The rotation of the electrode 3 causes the drum 1 to rotate about the electrode 3 and the electrode 4 turns simultaneously.

The pressure between the electrodes 3 and 4 is considerable and in order to produce uniformly successful welds I have found it necessary to apply power to rotate the opposite end of the drum at the same speed that the end being welded is rotated. This is accomplished in the arrangement shown in Fig. 1 by a pair of work engaging disks comprising a roll 16 inside the drum cooperating with a roll 17 outside the drum. If the drum is not driven at both ends, the undriven end tends to lag back slightly and the welding electrodes tend to cause the work to creep laterally. To reduce this creeping tendency to a minimum the rolls 16 and 17 are arranged to drive the drum at exactly the same speed as it is driven by the electrodes 3 and 4. The rolls are also preferably made of the same material as the electrodes and dressed down to the same contact face so that they will provide the same coefficient of friction as the electrodes.

It will be observed that the electrode disk inside the drum is shown as of smaller diameter than the electrode disk bearing on the outer surface of the drum. This is an important feature of my invention. I have discovered that a perfect weld may be made with the smaller electrode on the concave side of the work while a very rough and imperfect weld will be made if an attempt is made to weld the same work with the larger electrode on the concave side. With the smaller electrode in contact with the convex side of the work, metal will be picked up from the work by the electrode and this difficulty disappears when the arrangement of electrodes is reversed. I believe this to be due to the fact that the inside electrode by reason of the curvature of the work has a greater area of contact than the outside electrode and therefore if the inside electrode is of the same or greater size than the outside electrode there is a less area of contact and a greater current density and consequently a greater heating under the outside electrode. A current sufficiently large to weld therefore greatly overheats the material in contact with the outside electrode. The necessary difference in the diameter of the electrodes depends upon the degree of curvature of the work and the approximate dimensions necessary to equalize the heating may be readily determined by those skilled in the art from the principles here set forth.

Where different thicknesses of the same material are to be welded together a further consideration should be borne in mind and that is that the greater heat should be developed in the thicker sheet and therefore for flat work the smaller electrode should be in contact with the thicker sheet and the larger electrode in contact with the thinner sheet. When welding curved sheets, therefore, the size of the electrodes should be proportioned with reference to the differing thicknesses of material as well as with reference to the curvature of the work. Where sheets composed of metals of different specific resistances are to be welded the further consideration must be borne in mind that the smaller electrode should be placed in contact with the material having the lower resistance for flat work. When metals of different welding temperatures are to be united the larger wheel should be placed against the metal that welds at the lower temperature. Where combinations of these different factors are present, the electrodes will in each case be proportioned to give the nearest approximation to the correct welding temperature.

The matter just set forth will be more clearly understood from Figs. 7 and 8 which for simplicity illustrate the welding of a pair of flat sheets 18 and 19. The larger electrode 20 is shown in contact with the thinner sheet 18 and the smaller electrode 21 in contact with the thicker sheet 19. The electrode 20 is in this case also shown with a wider contact face than the electrode 21. It will be observed that the current density in the work is greater in the thick sheet 19 both by reason of the smaller diameter of the electrode 21 and the narrower contact face thereof. In Figs. 7 and 8 the thickness of the work is exaggerated so that the spreading of the current through the work may be more clearly indicated.

It is thus apparent that the current density in different parts of the work is dependent not only upon the relative diameters of the electrodes but also upon the width and shape of the contact faces. It is sometimes necessary to use electrodes of different diameters when welding flat work which consists of sheets of the same material and thickness. This may be necessary, for example, where deeply corrugated sheets are to be welded together between the corrugations. In order to permit of the highest part of the work clearing the supporting axis of the electrode it may be necessary to make one of the electrodes two feet or more in diameter thus producing a larger area of contact between such electrode and the sheet to be welded. In such case the smaller electrode will be given the greater width of contact face. While the current tends to spread in one plane by reason of the larger diameter of contact surface of one electrode it tends to spread in the other plane by reason of the greater width of contact surface of the smaller electrode. The current density and heating may thus be maintained at the proper value notwithstanding the excessive diameter of one of the electrodes.

It is sometimes desirable for another reason to make the contact faces of the electrodes of differing width for the reason that where both contact faces are of the minimum desired width any shifting or lateral movement of one contact face with respect to the other will change the density of the current in the areas of the work which contact with the electrodes. An overheating of the metal in contact with the electrodes may thereby occur causing the electrodes to pick up metal from the work as heretofore indicated. In welding two sheets of the same material and thickness the larger electrode may therefore be made with a narrower contact face. Normally the greater arc of contact possessed by the larger electrode will be compensated for by the wider width of contact possessed by the smaller electrode. The larger electrode is more apt to be sprung or distorted than the smaller electrode, but if either electrode shifts laterally with respect to the other, although the current density at the face of the electrode having the wider surface of contact will be changed slightly, the density of current at the contact face of the narrower electrode will remain practically the same and overheating may be prevented.

In the preceding discussion it has been assumed that the work is either flat or curved in the plane of the electrode. The same principle, however, applies to a certain extent in making a weld where the work is curved transversely to the plane of the electrode. For example, such a weld is represented by the longitudinal seam in a drum or tank. Such welding is indicated in Fig. 9 where the overlapped sheets 22 and 23 to be welded are curved in a plane transverse to the plane of the electrodes 24 and 25. It is apparent that the electrode 25 has a greater area of contact with the work than has the electrode 24. It is, therefore, desirable to dress the face of the electrode 25 slightly convex and to dress the face of the electrode 24 slightly concave. When the electrodes are thus dressed to equalize the current density and heating, the welding will be improved. Where the electrodes are of copper they tend to assume respectively convex and concave contact surfaces after they have been used for a short time since the copper is comparatively soft and is distorted after some use under pressure. By the time this desired contact surface has been acquired, however, the contact surfaces may have become so irregular that it is necessary to redress the electrodes. It is, therefore, desirable that the contact faces of the electrodes be dressed to the desired curvature in the first instance.

Referring to Figs. 1 and 2, it will be observed that the electrode and work engaging disk inside the drum are of considerably smaller diameter than the drum. This construction is of further importance in that it permits the drum to rock slightly on the electrode and disk to accommodate irregularities in the work. If for example the drum is not exactly round or the curvature of the drum disappears for a short distance the drum will rock about the supporting wheels to accommodate such irregularities. Small irregularities in the work may be ironed out by using an excessive pressure at the electrodes, but such pressure rapidly deforms the contact surfaces and is furthermore greater than is desirable for the uniform parts of the work. According to my invention the pressure may be adjusted to the desired value for all parts of the work and the life of the electrodes is increased.

Where for any reason it is desirable to make the inside electrode approximately the same size as the drum as, for example, where the drum is small the outside electrode should be of considerably larger diameter for the reasons heretofore set forth.

By driving both ends of the drum in the manner heretofore indicated in connection with the description of Figs. 1 and 2, the tendency of the drum to creep endwise is largely eliminated. If, however, a springing of one of the electrodes or some other cause tends to disturb the line of travel of the electrode, lateral creeping of the work may take place. If some arrangement is provided which prevents endwise movement of the drum this creeping may be prevented but only at the expense of subjecting the electrode to a considerable strain which reduces the length of time the electrode may be used without redressing. I, therefore, prefer to control the position of the work by angular adjustment of the axis either of one of the work engaging disk rolls or one of the electrodes. This means of correcting a tendency of the work to creep or move in a direction transverse to the line of welding as well as a means for controlling the movement of the electrodes to secure welding in a desired line forms the subject matter of my divisional application, Serial No. 507, filed January 5, 1925, and assigned to the same assignee as the present application. Referring to Fig. 3 the roll 17' is mounted in a bearing, the position of which may be adjusted by the hand wheel 26 operating through the worm 27 and worm wheel 28. Any tendency of the work to creep may be overcome by a slight angular adjustment of the roll 17' and the desired line of weld may be followed.

In the embodiment of my invention shown in Fig. 4 means are provided for automatically preventing creeping of the work. In the arrangement shown the angular adjustability is applied to the electrode 4'. The angular position of this electrode is controlled by the motor 29 driving the worm wheel 28' through the worm 27'. The operation of the motor is controlled by a suitable circuit controlling contact 30 carrying a shoe or roller 31 adapted to be pressed against the edge of the work by spring 32. When the work tends to move laterally the contact 30 will engage either the contact 33 or the contact 34 to cause the motor 29 to rotate in one direction or the other. In the arrangement diagrammatically indicated the contacts 33 and 34 are connected to the reversely wound motor field windings 35 and 36. The motor 29 may be supplied from any suitable source indicated for simplicity as a battery 37. Fig. 4 shows the electrode 3 and roll 16 as driven by gears 38 and 39 respectively engaged by gears 40 and 41 mounted on a shaft 42, which may be driven by any suitable power operated means.

The operation of the arrangement shown in Fig. 4 will be obvious from what has been heretofore set forth. When the work is in the proper position with respect to the electrodes, the contact 30 will lie in between the contacts 33 and 34 and the motor 29 will stand still. If the work tends to move endwise one way or the other, the motor 29 will be energized and operated in the proper direction to adjust the angular position of the electrode 4' so as to correct the tendency of the work to creep endwise. It is apparent that the roller 31 may be arranged to engage either end of the drum or may be arranged to engage a guiding flange which may be clamped in any desired position to the drum. Where a separate flange is clamped on in the manner indicated, it is apparent that the line of the weld will be governed by the contour of the flange which may be predetermined to give any desired line of weld. The application of the invention is not limited to circumferential welding since the same arrangement may be applied to the welding of flat work in which case the shoe or roller 31 will engage either the edge of one of the sheets to be welded or a guiding flange suitably clamped to one of the sheets.

In certain cases the production of a spiral weld may be desirable. Fig. 5 illustrates how the automatic arrangement of Fig. 4 may be arranged so as to produce a spiral weld of any desired pitch. In Fig. 5 the work is indicated as comprising two drums or shells 43 and 44 which are to be welded together by a spiral weld. 45 and 46 indicate either a pair of electrodes or a pair of guiding rolls. The contact-making device comprising the contacts 30, 33 and 34 and the shoe or roll 31 is in this case shown as comprising a member 47 arranged to be moved longitudinally by means of a screw 48 driven by means of adjustable speed gearing from the shaft 49 upon which the roll 45 is mounted. The adjustable speed gearing shown comprises a cone pulley 50 on the shaft 49 and a cone pulley 51 driving the shaft 48 and a belt 52, the position of which along the pulleys may be adjusted by any suitable means 53.

The operation of the arrangement shown in Fig. 5 would be the same as the operation of the arrangement shown in Fig. 4 if the screw 48 did not turn. Since, however, this screw is driven from the shaft 49 it follows that the device 47 carrying the contact shoe or roller 31 moves longitudinally over the surface of the drum. This causes the motor controlled by the contacts 30, 33 and 34 to adjust the angular position of the roll controlling creeping so as to cause the work to move endwise thus producing a spiral line of weld. The pitch of the spiral is dependent upon the speed relationship between the shafts 48 and 49 and by adjusting the belt 52 along the faces of the cone pulleys 50 and 51 this speed relationship may be adjusted to give the desired pitch.

Fig. 6 shows a modification of my invention in which the two ends 54 and 55 are arranged to be simultaneously welded into the drum 56. The inside electrodes 57 and 58 are indicated as driven by the gears 59 and 60 driven by the gears 61 and 62 mounted on the shaft 63 which is driven by suitable power operated means. The outside electrodes are shown at 64 and 65 and the angular position of the electrode 65 is shown as adjustable by means of the worm 66 and worm wheel 67 which may be controlled as in the arrangement of Figs. 3 or 4. A transformer 68 is indicated for supplying current to the electrodes 64 and 57 and a transformer 69 is indicated for supplying current to the electrodes 65 and 58. Suitable insulation will in all cases be provided for confining the current to the desired path in a manner well known in the art.

It will be obvious to those skilled in the art that many modifications and variations of the arrangements shown are possible and in the appended claims I intend to cover all such modifications as fall within the true spirit of my invention.

What I claim as new and desire to secure by Letters Patent of the United States, is:

1. The method of operating a welding machine of the type comprising a pair of rotatable disk electrodes arranged to engage the work from opposite sides in local arcs of contact and conduct welding current through the work while the electrodes and work are moving relatively to produce a line weld in curved work and wherein the contact surfaces of the electrodes are differently curved so that the arcs of contact between the respective electrodes and the work depends upon which electrode engages the concave side of the work, characterized by the fact that the work is placed between the electrodes with the electrode of the greater curvature engaging the concave side of the work while maintaining the areas of contact between the electrodes and the work substantially equal, so as substantially to equalize the heating under the electrodes.

2. The method of producing a circumferential line weld in curved work which comprises passing the work between a pair of rotatable disk electrodes having different diameters each engaging the work in a local arc of contact with the electrode of smaller diameter in contact with the concave side of the work while maintaining the areas of the local arcs of contact of such relative values that the heating under the electrodes is substantially equalized.

3. A welding machine for producing circumferential welds in curved work of the type wherein a pair of rotatable disk electrodes are arranged to contact in local arcs of contact with opposite sides of the work and lead welding current through the work while the electrodes and work are moving relatively to produce a line weld, characterized by the fact that the electrodes are of different diameters and by the fact that the electrode arranged to engage the concave surface of the work has a greater degree of curvature than the work; said electrodes being arranged to engage the work in local arcs of contact, having a contact area such as substantially to equalize the heating under the electrodes.

4. A welding machine for producing circumferential welds in drum work comprising a pair of rotatable disk electrodes adapted to contact respectively with the inside and outside surfaces of the work and conduct welding current through the work, a pair of work engaging disks spaced laterally from said electrodes and adapted to contact respectively with the inside and outside surfaces of the work, the inside electrode and inside work engaging disk being of smaller diameter than the work whereby the work may be supported upon and rock about said disks to accommodate irregularities in the contour of the work, and means for driving one of said electrodes and one of said work engaging disks to move the work relatively to the electrodes to produce a line weld, said work engaging disks being arranged to impart the same speed of movement to the work as is imparted by the electrodes.

5. A welding machine as claimed in claim 4 characterized by the fact that the work engaging disks also constitute electrodes to conduct welding current through the work whereby two circumferential welds may be made simultaneously.

In witness whereof, I have hereunto set my hand this 23rd day of August, 1923.

HARRY W. TOBEY.